(12) United States Patent
Keshav et al.

(10) Patent No.: US 10,383,143 B2
(45) Date of Patent: Aug. 13, 2019

(54) METHODS AND SYSTEMS FOR SIDELINK OPERATIONS FOR PROXIMITY BASED SERVICES IN MULTI SIM MULTI STANDBY USER EQUIPMENT

(71) Applicant: Samsung Electronics Co., Ltd., Suwon-si, Gyeonggi-do (KR)

(72) Inventors: Kirti Keshav, Bangalore (IN); Venkata Subba Rao Manne, Bangalore (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 40 days.

(21) Appl. No.: 15/670,244

(22) Filed: Aug. 7, 2017

(65) Prior Publication Data
US 2018/0255567 A1    Sep. 6, 2018

(30) Foreign Application Priority Data
Mar. 3, 2017   (IN) .............................. 201741007549

(51) Int. Cl.
| | | |
|---|---|---|
| H04W 8/18 | (2009.01) | |
| H04W 72/02 | (2009.01) | |
| H04W 72/12 | (2009.01) | |
| H04W 74/08 | (2009.01) | |
| H04W 76/11 | (2018.01) | |
| H04W 76/14 | (2018.01) | |
| H04W 88/06 | (2009.01) | |

(52) U.S. Cl.
CPC ....... *H04W 72/1289* (2013.01); *H04W 8/183* (2013.01); *H04W 76/14* (2018.02); *H04W 88/06* (2013.01); *H04W 72/02* (2013.01); *H04W 74/08* (2013.01); *H04W 76/11* (2018.02)

(58) Field of Classification Search
CPC . H04W 72/00; H04W 72/1289; H04W 76/14; H04W 88/06; H04W 76/11; H04W 74/08; H04W 8/005; H04W 88/04; H04W 72/04
See application file for complete search history.

(56) References Cited

U.S. PATENT DOCUMENTS

| | | | |
|---|---|---|---|
| 9,305,512 B2 | 4/2016 | Li et al. | |
| 2014/0295868 A1* | 10/2014 | Lee | H04W 76/27 455/452.1 |
| 2016/0302249 A1* | 10/2016 | Sheng | H04W 4/70 |
| 2017/0331577 A1* | 11/2017 | Parkvall | H04J 11/0079 |
| 2018/0070264 A1* | 3/2018 | Saiwai | H04W 72/04 |
| 2018/0124674 A1* | 5/2018 | Vutukuri | H04W 36/30 |

* cited by examiner

*Primary Examiner* — Diane D Mizrahi
(74) *Attorney, Agent, or Firm* — Harness, Dickey & Pierce, P.L.C.

(57) ABSTRACT

Method for sidelink operations for Proximity based Services (ProSe) in a multi Subscriber Identity Module (SIM) multi standby User Equipment (UE), the UE including at least a first SIM and a second SIM, may include detecting, by a sidelink management unit, whether one or more sidelink operations are triggered on the first SIM, the UE registered for the ProSe, determining, by the sidelink management unit, whether the one or more sidelink operations triggered on the first SIM are for a first activity or for one or more second activities, and reserving, by the sidelink management unit, at least one Radio Frequency (RF) resource of the UE for the first SIM to continue the one or more sidelink operations triggered on the first SIM if the one or more triggered sidelink operations are for the first activity.

17 Claims, 3 Drawing Sheets

METHODS AND SYSTEMS FOR SIDELINK OPERATIONS FOR PROXIMITY BASED SERVICES IN MULTI SIM MULTI STANDBY USER EQUIPMENT

CROSS-REFERENCE TO RELATED APPLICATIONS

This application claims priority under 35 U.S.C. § 119(a) to an Indian Patent Application Serial No. 201741007549 (CS), which was filed on Mar. 3, 2017 in the Indian Intellectual Property Office, the entire disclosure of which is incorporated herein by reference.

BACKGROUND

1. Technical Field

Example embodiments herein relate to wireless communication systems, and more particularly, to sidelink operations in User Equipments (UEs) of the wireless communication systems.

2. Description of the Related Art

Third Generation Partnership Project (3GPP) standard for wireless communications has introduced availability of Proximity based Services (ProSe) in Long Term Evolution (LTE) Release-12. This enables cellular networks such as the LTE network to utilize broadband communication technology for public safety networks. To enable ProSe, sidelink operations are defined in 3GPP that enable User Equipments (UEs) in proximity to directly communicate with each other using RF resources allocated to the UE. The ProSe can be used for multiple tasks including mission critical operations or activities such as public safety, as well as for general services (e.g., social networking and/or targeted advertisement). The ProSe enables reducing data load on cellular networks. The ProSe implementation enables the UE to initiate sidelink operations as defined in the 3GPP specification for communicating with UEs in proximity. The sidelink transmission is designed to use the existing uplink hardware of the UE. Any UE registered for sidelink feature can initiate the sidelink procedure and perform device discovery and communication in accordance with the current 3GPP specification.

However, for a UE with multi Subscriber Identity Module (SIM) multi standby operation (for example, a Dual SIM Dual Standby (DSDS) UE), where the Radio Frequency (RF) resources of the UE are shared between the multiple SIMs of the UE, the current sidelink procedures defined in the 3GPP standard may not provide clarity on procedures to be followed in typical scenarios. For example, consider a scenario where a SIM 1 of the DSDS UE, which is registered for the ProSe services, loses network coverage of its network operator 1 due to emergency such as fire in the building. Currently, as per the defined 3GPP specification the UE may initiate the sidelink operations on SIM 1. Further, in the DSDS scenario, the UE is supposed to share the RF resources between the SIM 1 and SIM 2 of network operator 2. Thus, even though sidelink operations may be triggered on SIM 1, as per the standard RF resources sharing procedures of DSDS UEs, the RF is allotted to the SIM 2 for reception of any paging sequence on SIM 2. If the paging sequence is received, the UE may switch to network operator 2. Thus, the sidelink operations triggered on SIM 1 may be held up till the UE allots the RF resources back to SIM 1. Thus, sidelink procedures that are initiated on SIM 1 for mission critical activity (public safety measure) may get delayed according to the current standards. Such a delay is undesirable, and/or may be prove fatal in mission critical activities (e.g., building on fire, earthquake, or cyclone). Moreover, in mission critical activity, a quick communication with any UE in proximity is desired. For sidelink operation to work, new channels such as Sidelink Broadcast Channel (SL-BCH), Sidelink Discovery Channel (SL-DCH) and Sidelink Shared Channel (SL-SCH) are defined by the 3GPP specifications. For public safety feature (mission critical activity) to work effectively using sidelink in DSDS scenario, a comprehensive usage of the RF is desired for broadcast and/or shared channel usage.

SUMMARY

Some example embodiments provides methods and/or wireless communication systems for sidelink operations for Proximity based Services (ProSe) in a multi Subscriber Identity Module (SIM) multi standby User Equipment (UE), which includes at least a first SIM and a second SIM.

Some example embodiments provides a method for reserving Radio Frequency (RF) resources of the UE for the first SIM in response to detecting that sidelink operation triggered on the first SIM are for a mission critical activity, thereby enabling the sidelink operations triggered on the first SIM to run without interruption.

Some example embodiments provides a method for converting a Mobile Terminated (MT) call received on the first SIM or the second SIM to a Voice over Wi-Fi (VoWiFi) call in response to the sidelink operations running at the first SIM for the mission critical activity.

An example embodiment may provide a method of sharing the RF resources of the UE based on a sharing mechanism, in response to detecting that the sidelink operations triggered by the first SIM are for one or more non-mission critical activities.

According to an example embodiment, a method for sidelink operations for Proximity based Services (ProSe) in a multi Subscriber Identity Module (SIM) multi standby User Equipment (UE), the UE including at least a first SIM and a second SIM, may include detecting, by a sidelink management unit, whether one or more sidelink operations are triggered on the first SIM, the UE registered for the ProSe, determining, by the sidelink management unit, whether the one or more sidelink operations triggered on the first SIM are for a first activity or for one or more second activities, and reserving, by the sidelink management unit, at least one Radio Frequency (RF) resource of the UE for the first SIM to continue the one or more sidelink operations triggered on the first SIM if the one or more triggered sidelink operations are for the first activity.

According to an example embodiment, a multi Subscriber Identity Module (SIM) multi standby User Equipment (UE) configured to perform sidelink operations for Proximity based Services (ProSe), the UE including at least a first SIM and a second SIM and registered for the ProSe, may include a sidelink management unit configured to detect whether the one or more sidelink operations are triggered on the first SIM, determine whether the one or more sidelink operations triggered on the first SIM are for a first activity or one or more second activities, and reserve at least one Radio Frequency (RF) resource of the UE for the first SIM to continue the one or more sidelink operations triggered on the first SIM if the one or more triggered sidelink operations are for the first activity.

According to an example embodiment, a multi Subscriber Identity Module (SIM) multi standby User Equipment (UE) configured to perform sidelink operations for Proximity based Services (ProSe), the UE including at least a first SIM and a second SIM and registered for the Prose, may include a memory configured to store computer-readable instructions, and at least one processor configured to execute the computer-readable instructions such that the at least one processor is configured to detect whether the one or more sidelink operations are triggered on the first SIM, determine whether the one or more sidelink operations triggered on the first SIM are for a first activity or for one or more second activities, and reserve at least one Radio Frequency (RF) resource of the UE for the first SIM to continue the one or more sidelink operations triggered on the first if the one or more triggered sidelink operations are for the first activity.

These and other aspects of example embodiments herein will be better appreciated and understood when considered in conjunction with the following description and the accompanying drawings. It should be understood, however, that the following descriptions, while indicating some example embodiments and numerous specific details thereof, are given by way of illustration and not of limitation. Many changes and modifications may be made within the scope of example embodiments without departing from the spirit thereof, and example embodiments herein include all such modifications.

BRIEF DESCRIPTION OF THE DRAWINGS

Some example embodiments are illustrated in the accompanying drawings, throughout which like reference letters indicate corresponding parts in the various figures. The example embodiments herein will be better understood from the following description with reference to the drawings, in which.

DETAILED DESCRIPTION

Example embodiments and various features and advantageous details thereof are explained more fully with reference to the non-limiting example embodiments that are illustrated in the accompanying drawings and detailed in the following description. Descriptions of well-known components and processing techniques are omitted so as to not unnecessarily obscure example embodiments. The examples used herein are intended merely to facilitate an understanding of ways in which example embodiments herein may be practiced and to further enable those skilled in the art to practice example embodiments. Accordingly, the disclosed example embodiments should not be construed as limiting the scope of example embodiments.

The example embodiments herein may provide methods and wireless communication systems for sidelink operations for Proximity based Services (ProSe) in a multi Subscriber Identity Module (SIM) multi standby User Equipment (UE) including at least a first SIM and a second SIM. An example embodiment provides a method including reserving Radio Frequency (RF) resources of the UE for the first SIM in response to detecting that sidelink operation triggered on the first SIM are for a mission critical activity, thereby enabling continuation of the sidelink operations on the first SIM without delay and/or interruption. Further, an example embodiment provides a method including converting a Mobile Terminated (MT) call received on the first SIM or the second SIM to a Voice over Wi-Fi (VoWiFi) call in response to the sidelink operations are running at the first SIM for the mission critical activity. Further, an example embodiment provides a method including sharing the RF resources of the UE based on a sharing mechanism, in response to detecting that the sidelink operations triggered by the first SIM are for one or more non-mission critical activities.

Methods according to some example embodiments may define operations for sidelink operations for multi SIM multi standby UE during mission critical activity (e.g., public safety feature). Thus, such method may effectively reduce delay in communicating with UEs in proximity for the ProSe services. Further, such method may reduce the delay in comprehensive usage of the RF resources of the UE by reserving the RF resources for the broadcast, discovery, and shared channel usage during mission critical activity.

In an example embodiment, the UE may be a mobile phone, a smart phone, a laptop, a palmtop, a computer, a wearable computing device, a tablet or any UE supporting the multi SIM multi standby implementation and the ProSe services.

In an example embodiment, the wireless communication network may be any cellular network configured to support ProSe services such as a Long Term Evolution (LTE) Network.

Figure 1:
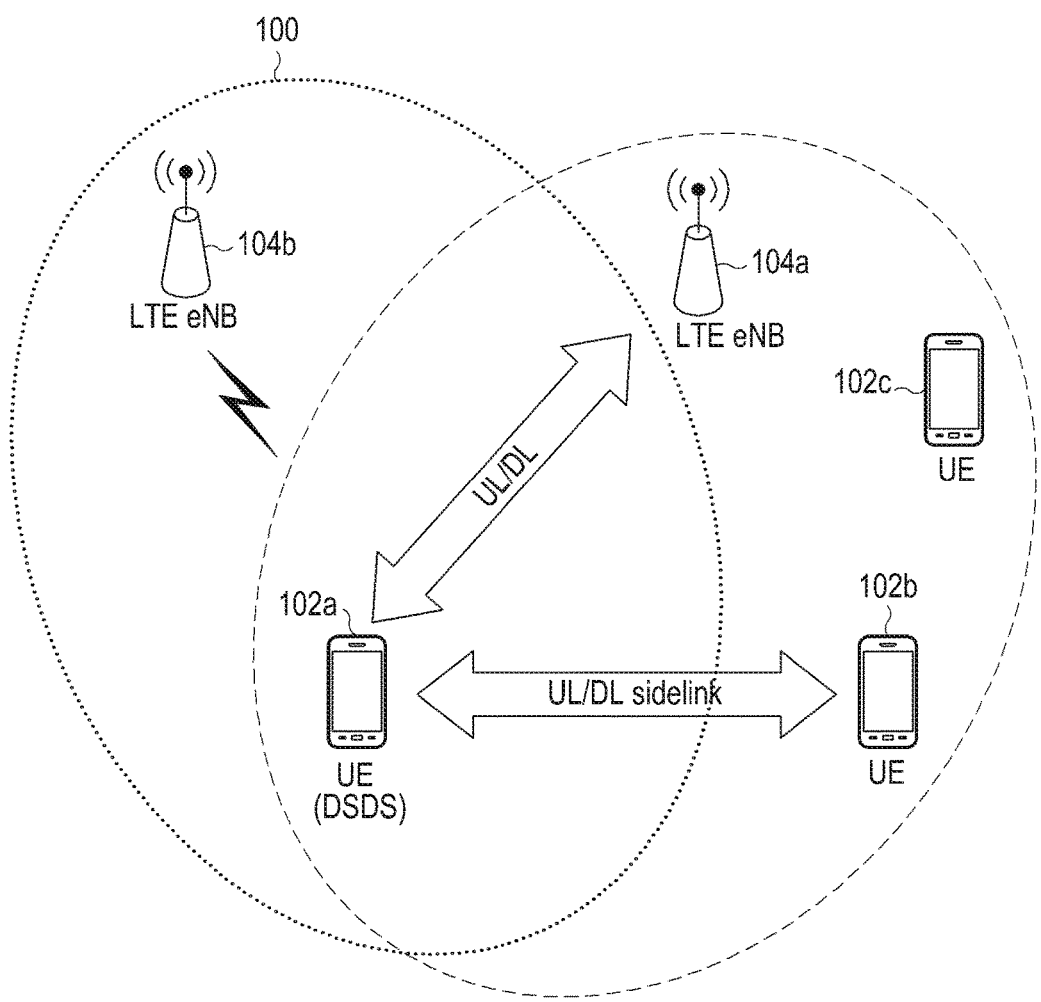
FIG. 1 illustrates an example wireless communication system providing Proximity based Services (ProSe) to User Equipment (UE), according to an example embodiment.
Figure 2:
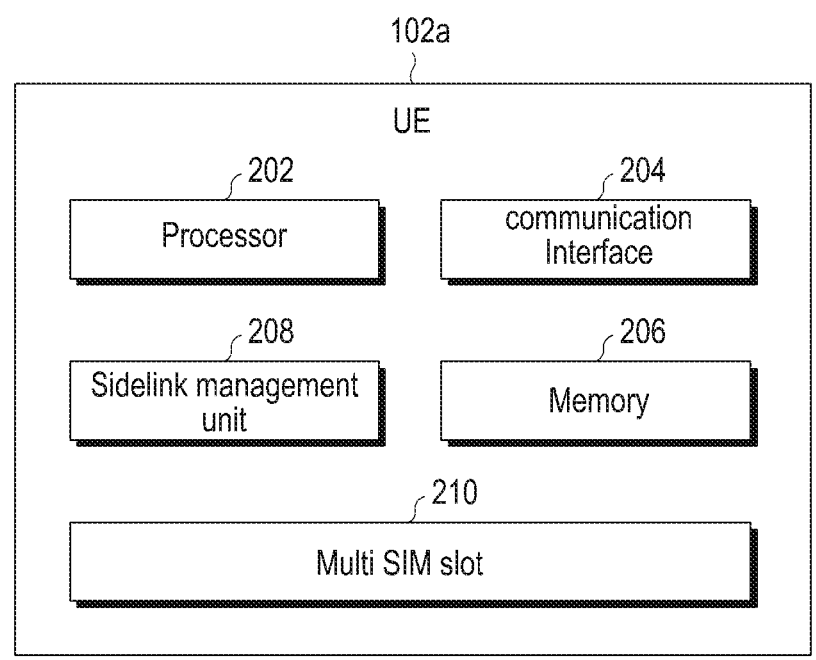
FIG. 2 illustrates a plurality of components of a multi Subscriber Identity Module (SIM) multi standby UE for sidelink operations for the ProSe services, according to an example embodiment.
Figure 3:
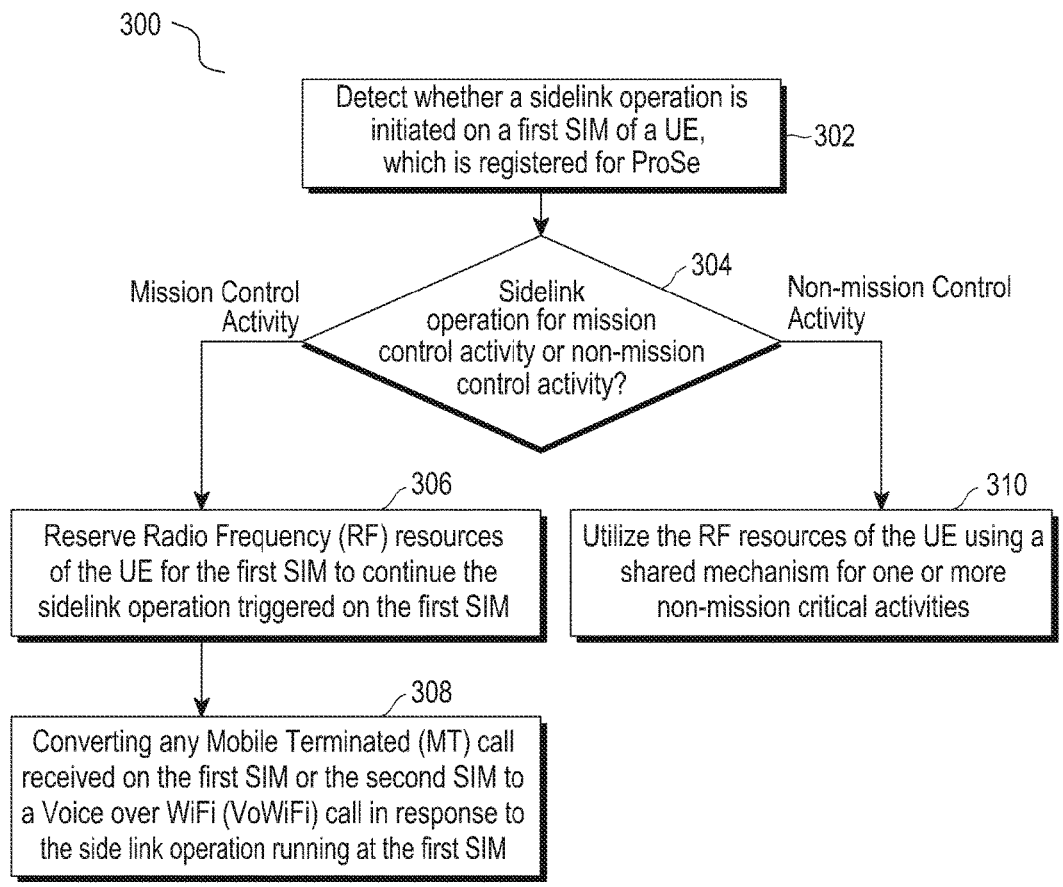
FIG. 3 is a flow diagram illustrating a method for the sidelink operations for the ProSe in the multi SIM multi standby UE based on whether the sidelink operation is for a mission critical activity and one or more non-mission critical activities, according to an example embodiment.

Referring now to the drawings, and more particularly to FIGS. 1 through 3, some example embodiments will be described. Similar reference characters denote similar features throughout the figures.

FIG. 1 illustrates an example wireless communication system 100 providing Proximity based Services (ProSe) to User Equipment (UEs), according to an example embodiment. As depicted in the figure, the wireless communication network 100 may be a LTE Network, in which a LTE eNB 104*a* is deployed by a first operator, and a LTE eNB 104*b* is deployed by a second operator to provide cellular services to the UEs (e.g., UE 102*a*, UE 102*b*, and UE 102*c*) that lie within the network coverage of the LTE eNBs. The UE 102*a* may be a multi SIM multi standby UE with at least a first SIM subscribing services from the first operator and a second SIM subscribing services from the second operator and share its RF resources among the multiple SIMs. The UE 102*a* may communicate with the LTE eNB 104*a* and the LTE eNB 104*b* on the corresponding allocated uplink (UL) and downlink (DL) channels or frequencies. The UE 102*a* may be registered for the ProSe comprising the mission critical activity (e.g., public safety) and the non-mission critical activity (e.g., targeted advertising or social networking).

For simplicity and ease of understanding of the described methods, a Dual SIM Dual Standby (DSDS) UE will be explained as an example of the multi SIM multi standby UE 102*a*. However, example embodiments are not limited thereto.

The UE 102*a* may trigger the sidelink operations to directly communicate with any UE in proximity such as UE 102*b* using allocated UL/DL channels of the corresponding SIM. The UE 102*b* may be a DSDS UE, a single SIM UE or a Dual Sim Dual active UE with capability to support ProSe services and sidelink operations for the ProSe services. The UE 102a can trigger the sidelink operations on any one of the available SIMs (e.g., the first SIM). Triggering of the sidelink operation may be due to mission critical activity (e.g., public safety), or due to non-mission critical activity (e.g., advertisement, social networking applications such as friend finder or the like). The UE 102a may be configured to detect whether the sidelink operations are triggered on the first SIM, and then identify whether the sidelink operations triggered on the first SIM are for the mission critical activity or for the non-mission critical activity. The UE 102a may be configured to detect the mission critical activity based on, for example, mechanisms (e.g., a cross layer mechanism), protocol messages, or sensors. In the case that the UE 102a detects the mission critical activity based on the cross layer mechanism, the UE 102a may be configured to extract information indicating the mission critical activity from an application layer in the UE 102a and provide the information to the physical layer that manages the sidelink operations.

During emergency situations (e.g., fire, earthquakes, or cyclones), there exists a strong possibility that the wireless communication networks are down. In such situations the first SIM of the UE 102a may be disconnected from LTE 104a, and trigger sidelink operations for the mission critical activity. The wireless communication system 100 may enable the UE 102a to provide priority to the triggered sidelink operations over other protocol operations (e.g., Out of Sync (OOS) recovery). Thus, the UE 102a, on confirmation that the sidelink operations are triggered for the mission critical activity, may be configured to reserve the Radio Frequency (RF) resources of the UE 102a for the first SIM so as to continue the sidelink operations triggered on the first SIM without being interrupted and/or without any delay.

However, if the sidelink operations are detected to be triggered for non-mission critical activity, then the RF resources of the UE 102a may be allotted to the SIMs for sidelink operations using a shared mechanism (e.g., round robin). The UE 102a may be configured to utilize the reserved RF resources for performing sidelink operations and enabling the public safety communication. For example, the sidelink operations may include procedures for a Sidelink Broadcast Channel (SL-BCH), procedures for a Sidelink Discovery Channel (SL-DCH), or procedures for a Sidelink Shared Channel (SL-SCH).

Further, during running of the sidelink operations on the first SIM, if the UE 102a receives a Mobile Terminated (MT) call (e.g., a Voice Over LTE (VoLTE call)) on the first SIM or the second SIM, the UE may be configured to convert the VoLTE call to a Voice over Wi-Fi (VoWiFi) call. Thus, the sidelink operations running at the first SIM may continue without being interrupted for the mission critical activity, while continuing the call as VoWiFi call.

FIG. 2 illustrates a plurality of components of a multi Subscriber Identity Module (SIM) multi standby UE 102a for sidelink operations for the ProSe services, according to an example embodiment.

Referring to FIG. 2, the UE 102a may include a processor 202, a communication interface 204, and a memory 206. The communication interface 204 may allow the UE 102a to communicate with network elements (e.g., LTE eNB 104) of the wireless communication system 10,0 and with other UEs (e.g., UE 102b and UE 102c) through cellular networks, Wi-Fi networks, device to device communication for the ProSe and the like. The memory 206 may store any data generated during the sidelink operations. Further, the UE 102a may further include a sidelink management unit 208.

The sidelink management unit 208 may be configured to manage sidelink operations for multiple SIMs of the UE 102a (e.g., the first SIM or the second SIM in the multi SIM slot 210). The sidelink management unit 208 may be implemented by one or more processor separately provided from the processor 202. In some example embodiments, a portion or portions of the processor 202 may be configured to perform the operations of the sidelink management unit 208, without separately providing the sidelink management unit 208. In some example embodiments, the sidelink management unit 208 may include a memory configured to store computer-readable instructions, an at least one processor configured to execute the computer-readable instructions. The memory of the sidelink management unit 208 may be the memory 206, or a memory being separate from the memory 206. The at least one processor of the sidelink management unit 208 may be the processor(s) 202, or at least one processor being separate from the processor 202.

If desired, the UE 102a may trigger the sidelink operations to directly communicate with any UE in proximity such as UE 102b. The UE 102a can trigger the sidelink operations on any one of the SIMs (e.g., the first SIM). Triggering of the sidelink operation may be due to mission critical activity (e.g., public safety), or due to non-mission critical activity (e.g., advertisement, or social networking applications such as friend finder). The sidelink management unit 208 may be configured to detect whether the sidelink operations are triggered on the first SIM, and then identify whether the sidelink operations triggered on the first SIM are for the mission critical activity or the non-mission critical activity. The sidelink management unit 208 may be configured to detect the mission critical activity based on, for example, the cross layer mechanism, protocol messages, or sensors.

In emergency situations, the first SIM of the UE 102a may be disconnected from LTE 104a, and may trigger sidelink operations for the mission critical activity. The sidelink management unit 208 may enable the UE 102a to provide priority to the triggered sidelink operations over other protocol operation (e.g., the OOS recovery). Thus, the sidelink management unit 208, on confirmation that the sidelink operations are triggered for the mission critical activity, may be configured to reserve the RF resources of the UE 102a for the first SIM so as to continue the sidelink operations triggered on the first SIM without being uninterrupted and/or without any delay.

However, if the sidelink operations are detected to be triggered for non-mission critical activity, then the RF resources of the UE 102a may be allotted to the SIMs for sidelink operations using a shared mechanism (e.g., round robin). The sidelink management unit 208 may be configured to utilize the reserved RF resources for performing sidelink operations and enabling the public safety communication. Further, during running of the sidelink operations on the first SIM, if the UE 102a receives a Mobile Terminated (MT) call (e.g., a Voice Over LTE (VoLTE call)) on the first SIM or the second SIM, the sidelink management unit 208 may be configured to convert the VoLTE call to the VoWiFi call. Thus, the sidelink operations running at the first SIM may continue without being interrupted for the mission critical activity, while continuing the call as a VoWiFi call.

FIG. 3 is a flow diagram illustrating a method 300 for the sidelink operations for the ProSe in the multi SIM multi standby UE 102a based on whether the sidelink operation is for a mission critical activity or one or more non-mission critical activities, according to an example embodiment.

The UE 102a may trigger sidelink operations to directly communicate with any UE in proximity, for example, UE 102b. The UE 102b may be a DSDS UE, a single SIM UE, or a Dual Sim Dual active UE with capability to support ProSe services and sidelink operations for the ProSe services. The UE 102a may trigger the sidelink operations on either of the SIMs (e.g., the first SIM). Triggering of the sidelink operation may be due to mission critical activity (e.g., public safety), or due to non-mission critical activity (e.g., advertisement or social networking applications such as friend finder or the like). At step 302, the method 300 may allow the sidelink management unit 208 to detect whether the sidelink operations are triggered on the first SIM. At step 304, the method 300 may allow the sidelink management unit 208 to identify whether the sidelink operations triggered on the first SIM are for the mission critical activity or the non-mission critical activity. The sidelink management unit 208 may be configured to detect the mission critical activity based on, for example, mechanisms (e.g., cross layer mechanism), protocol messages, or sensors. In the case that the UE 102a detects the mission critical activity based on the cross layer mechanism, the sidelink management unit 208 may be configured to extract information indicating the mission critical activity from the application layer in the UE 102a and provide the information to the physical layer that manages the sidelink operations.

During emergency situations (e.g., fire, earthquakes, or cyclones), there exists a strong possibility that the wireless communication networks are down. In such situations, the first SIM of the UE 102a may be disconnected from LTE 104a, and may trigger sidelink operations for the mission critical activity. Thus, the method 300 may allow the sidelink management unit 208 to provide priority to the triggered sidelink operations over other protocol operation (e.g., Out of Sync (OOS) recovery)). On confirmation that the sidelink operations are triggered for the mission critical activity, at step 306, the method 300 may allow the sidelink management unit 208 to reserve the Radio Frequency (RF) resources of the UE 102a for the first SIM so as to continue the sidelink operations triggered on the first SIM without being interrupted and/or without any delay.

However, if the sidelink operations are detected to be triggered for non-mission critical activity, then at step 310, the method 300 may allow the sidelink management unit 208 to allot the RF resources of the UE 102a to the SIMs for sidelink operations using the shared mechanism (e.g., the round robin). The UE 102a may be configured to utilize the reserved RF resources for performing sidelink operations, and enable the public safety communication. For example, the sidelink operations may include performing operations for a Sidelink Broadcast Channel (SL-BCH), a Sidelink Discovery Channel (SL-DCH), or a Sidelink Shared Channel (SL-SCH).

Further, during running of the sidelink operations on the first SIM, if the UE 102a receives the MT call (e.g., a Voice Over LTE (VoLTE call)) on the first SIM or the second SIM, at step 308, the method 300 may allow the sidelink management unit 208 to convert the VoLTE call to the VoWiFi call so that the sidelink operations running at the first SIM can continue without being interrupted for the mission critical activity, while continuing the call as VoWiFi call.

The various operations in method 300 may be performed in the order presented, in a different order, or simultaneously. Further, in some example embodiments, some actions listed in FIG. 3 may be omitted.

The example embodiments disclosed herein may be implemented through at least one software program running on at least one hardware device and configured to perform network management functions to control the network elements. The network elements shown in FIG. 1 through FIG. 2 may include blocks which include at least one of a hardware device, or a combination of hardware device and software module.

The foregoing description of the specific example embodiments will so fully reveal the general nature of example embodiments. The example embodiments, by applying current knowledge, can be modified and/adapted for various applications of the disclosed specific example embodiments without departing from the inventive concepts. Such adaptations and modifications should be comprehended within the meaning and range of equivalents of the disclosed example embodiments. It is to be understood that the phraseology or terminology employed herein is for the purpose of description and not of limitation. Therefore, while example embodiments herein have been described in terms of some example embodiments, those skilled in the art will recognize that the example embodiments herein can be practiced with modification within the spirit and scope of example embodiments.

What is claimed is:

1. A method for sidelink operations for Proximity based Services (ProSe) in a multi Subscriber Identity Module (SIM) multi standby User Equipment (UE), the UE including at least a first SIM and a second SIM, the method comprising:
   detecting, by a sidelink management unit, whether one or more sidelink operations are triggered on the first SIM, the UE registered for the ProSe;
   determining, by the sidelink management unit, whether the one or more sidelink operations triggered on the first SIM are for a first activity or for a second activity;
   reserving, by the sidelink management unit, at least one Radio Frequency (RF) resource of the UE for the first SIM to continue the one or more sidelink operations triggered on the first SIM in response to the one or more triggered sidelink operations being for the first activity, and
   continuously performing the one or more sidelink operations triggered on the first SIM based on the reserved at least one RF resource,
   wherein the first activity includes a mission critical activity and the second activity includes non-mission critical activity.

2. The method of claim 1, further comprising:
   converting, by the sidelink management unit, a Mobile Terminated (MT) call received on one of the first SIM and the second SIM to a Voice over Wi-Fi (VoWiFi) call in response to the one or more sidelink operations running at the first SIM for the first activity.

3. The method of claim 1, further comprising:
   utilizing the RF resources of the UE using a shared mechanism to handle the second activity in response to the one or more sidelink operations initiated for the second activity.

4. The method of claim 1, wherein the one or more sidelink operations comprise performing operations for a Sidelink Broadcast Channel (SL-BCH), a Sidelink Discovery Channel (SL-DCH), or a Sidelink Shared Channel (SL-SCH).

5. The method of claim 1, wherein the one or more sidelink operations triggered on the first SIM for the first activity is detected using a cross layer mechanism.

6. The method of claim 1, further comprising:
providing, by the sidelink management unit, priority to the one or more sidelink operations triggered on the first SIM based on the reserved at least one RF resource.

7. A multi Subscriber Identity Module (SIM) multi standby User Equipment (UE) configured to perform sidelink operations for Proximity based Services (ProSe), the UE including at least a first SIM and a second SIM and register for the ProSe, the multi SIM multi standby UE comprising:
a sidelink management unit configured to,
detect whether one or more sidelink operations are triggered on the first SIM;
determine whether the one or more sidelink operations triggered on the first SIM are for a first activity or a second activity;
reserve at least one Radio Frequency (RF) resource of the UE for the first SIM to continue the one or more sidelink operations triggered on the first SIM in response to the one or more triggered sidelink operations being for the first activity; and
continuously perform the one or more sidelink operations triggered on the first SIM based on the reserved at least one RF resource,
wherein the first activity includes a mission critical activity and the second activity includes non-mission critical activity.

8. The multi SIM multi standby UE of claim 7, wherein the sidelink management unit is further configured to convert a Mobile Terminated (MT) call received on one of the first SIM and the second SIM to a Voice over Wi-Fi (VoWiFi) call in response to the one or more sidelink operations running at the first SIM for the first activity.

9. The multi SIM multi standby UE of claim 7, wherein the sidelink management unit is further configured to utilize the RF resources of the UE using a shared mechanism to handle the second activity in response to the one or more sidelink operations are initiated for the second activity.

10. The multi SIM multi standby UE of claim 7, wherein the sidelink management unit is further configured to one or more perform operations for a Sidelink Broadcast Channel (SL-BCH), a Sidelink Discovery Channel (SL-DCH), or a Sidelink Shared Channel (SL-SCH) for the sidelink operations.

11. The multi SIM multi standby UE of claim 7, wherein the sidelink management unit is further configured to detect the one or more sidelink operations triggered on the first SIM for the first activity using a cross layer mechanism.

12. The multi SIM multi standby UE of claim 7, wherein the sidelink management unit is configured to enable the UE to provide priority to the one or more sidelink operations triggered on the first SIM based on the reserved at least one RF resource.

13. A multi Subscriber Identity Module (SIM) multi standby User Equipment (UE) configured to perform sidelink operations for Proximity based Services (ProSe), the UE including at least a first SIM and a second SIM and registered for the Prose, the multi SIM multi standby UE comprising:
a memory configured to store computer-readable instructions; and
at least one processor configured to execute the computer-readable instructions such that the at least one processor is configured to,
detect whether one or more sidelink operations are triggered on the first SIM,
determine whether the one or more sidelink operations triggered on the first SIM are for a first activity or for a second activity,
reserve at least one Radio Frequency (RF) resource of the UE for the first SIM to continue the one or more sidelink operations triggered on the first SIM in response to the one or more triggered sidelink operations being for the first activity, and
continuously perform the one or more sidelink operations triggered on the first SIM based on the reserved at least one RF resource,
wherein the first activity includes a mission critical activity and the second activity includes non-mission critical activity.

14. The multi SIM multi standby UE of claim 13, wherein the at least one processor is further configured to convert a Mobile Terminated (MT) call received on one of the first SIM and the second SIM to a Voice over Wi-Fi (VoWiFi) call in response to the one or more sidelink operations running at the first SIM for the first activity.

15. The multi SIM multi standby UE of claim 13, wherein the at least one processor is further configured to utilize the RF resources of the UE using a shared mechanism to handle the second activity in response to the one or more sidelink operations initiated for the second activity.

16. The multi SIM multi standby UE of claim 13, wherein the at least one processor is further configured to perform one or more operations for a Sidelink Broadcast Channel (SL-BCH), a Sidelink Discovery Channel (SL-DCH), or a Sidelink Shared Channel (SL-SCH) for the sidelink operations.

17. The multi SIM multi standby UE of claim 13, wherein the at least one processor is further configured to detect the one or more sidelink operations triggered on the first SIM for the first activity using a cross layer mechanism.

* * * * *